BEST AVAILABLE COPY

United States Statutory Invention Registration [19]

[11] Reg. Number: H35

Berkowitz

[45] Published: Mar. 4, 1986

[54] FREEZE DRIED COOKED MEATS

[75] Inventor: Daniel Berkowitz, Wellesley, Mass.

[73] Assignee: The United States of America as represented by the Secretary of the Army, Washington, D.C.

[21] Appl. No.: 665,899

[22] Filed: Oct. 29, 1984

[51] Int. Cl.[4] ..... A23L 1/317

[52] U.S. Cl. ..... 426/135; 426/272; 426/385; 426/513; 426/646

[58] Field of Search ..... 426/129, 135, 272, 641, 426/646, 652, 385, 392, 444, 456, 464, 513, 523, 810, 412, 413, 414, 415, 644

[56] References Cited

U.S. PATENT DOCUMENTS

| | | | |
|---|---|---|---|
| 2,888,351 | 5/1959 | Olson et al. | 426/646 X |
| 3,067,043 | 12/1962 | Marsh et al. | 426/646 |
| 3,076,713 | 2/1963 | Maas | 426/641 X |
| 3,150,985 | 9/1964 | Buscemi et al. | 426/641 |
| 3,309,207 | 3/1967 | Tuomy et al. | 426/646 X |
| 3,432,311 | 3/1969 | Gruner | 426/272 X |
| 3,573,062 | 3/1971 | Paynter et al. | 426/641 X |
| 3,679,434 | 7/1972 | Bard et al. | 426/272 |
| 3,740,235 | 6/1973 | Weiner | 426/646 |
| 3,852,487 | 12/1974 | Van Werven et al. | 426/646 X |
| 3,971,854 | 7/1976 | Hinnergardt | 426/641 X |
| 4,058,633 | 11/1977 | Staff et al. | 426/646 X |
| 4,210,677 | 7/1980 | Huffman | 426/641 X |
| 4,287,218 | 9/1981 | Rich et al. | 426/272 |
| 4,377,597 | 3/1983 | Shapiro et al. | 426/641 X |

FOREIGN PATENT DOCUMENTS

| | | | |
|---|---|---|---|
| 20679 | 4/1972 | Austria | 426/272 |

*Primary Examiner*—Edward A. Miller

*Attorney, Agent, or Firm*—Robert P. Gibson; Anthony T. Lane; Mark Goldberg

[57] ABSTRACT

This invention provides a method of producing dehydrated meat products which more easily and completely rehydrate than prior art dehydrated meats. This is accomplished by expansion of the cooked meat matrix by the addition of water, salt, phosphate and adjunctive hydrophilic ingredients prior to cooking. This invention is intended for use with formed meats consisting of a combination of chunked, flaked and ground or emulsified meats. The use of a gas and moisture impermeable casing for cooking the meat allows the meat to be fully cooked without concurrent losses in either weight or volume, thus preventing density increase prior to dehydration.

3 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FREEZE DRIED COOKED MEATS

The invention described herein may be manufactured, used, and licensed by or for the Government for governmental purposes without the payment to me of any royalty thereon.

BACKGROUND OF THE INVENTION

This invention relates to a method of producing freeze-dried cooked meats which rehydrate rapidly and avoid problems caused by meats which do not rehydrate fully, and, typically have numerous unpalatable hard spots. This improvement is accomplished by expanding the matrix of the meat so as to provide pathways for water to rehydrate the meat.

It is well known that foods may be preserved for long periods by dehydration and that dehydrated meat items frequently do not rehydrate quickly or to the extent required for optimum palatability and tenderness. Among dehydration methods, freeze drying is the least detrimental to meat texture and rehydratability. Freeze drying, the sublimation of ice to water vapor under vacuum, results in drying without significant change in product volume. The meat matrices obtained are therefore significantly more porous that those of meats dried by other means. While the rate and extent of rehydration of freeze dried meats is superior to that of meat items otherwise dried, rehydration remains relatively slow and incomplete, resulting in "hard spots" in cooked rehydrated meats.

In order to produce dehydrated meats requiring only rehydration prior to their being consumed, they must be cooked prior to their being dried. Dehydrated cooked meats may be the meat component of stews; or steaks, chops or pattie-like products. Typically, cooked meats destined to be freeze dried are heated to an internal temperature of 140° F. or more by dry or moist heat resulting in pre-dehydration moisture and fat cook-out in the range of 25%-50% of the meat's raw weight.

Cooking also results in disruption of cell membrane function and in coagulation of intercellular and intracellular proteins. The heat denaturation of meat proteins creates a largely static condition with respect to water and substances in solution within and external to cells which comprise meat tissue. In living tissue, the mass of individual cells imbibe or excrete water in response to changes in osmotic pressures as a result of changes in solute level, thereby maintaining optimum solute/solvent concentration for cell function. Fresh, raw meats retain much of this function which cooking largely destroys. Changes in meat density and its physiological state as a result of heat denaturation contribute directly to problems relative to the rehydration of meats which have been cooked and subsequently freezed dried.

Rehydration of freeze dried cooked meat generally involves its immersion in 150° F. or warmer water. Since cooked meat protein is largely denatured and cell membranes no longer function effectively with respect to osmotic gradient changes, hydration occurs primarily by absorption. Water moves gradually from surface to center of the meat particles, the rate of absorption being dependent on a number of factors including the dried meat's affinity for water, its density, its volume, the amount of fat, the degree of myofibrillar protein cross linking, the concentration of salts and their availability, the temperature to which the meat was cooked initially and the temperature of the rehydration water.

These factors are directly affected by cooking. Meat protein which has been denatured due to cooking loses much of its affinity for water. Conventional cooking methods increase meat density by evaporative and syneresis effects and cause rendered fats to coagulate in interstitial spaces within the meat structure, thus further inhibiting penetration by water in meat which has been dried. Increased meat density may heighten the potential for myosin cross linking, which also inhibits rehydration. Obtaining hot water and maintaining its temperature for sufficient time to rehydrate the meat is not always practicable for the military. As a result, the cooked meat components of freeze dried foods of the prior art are slow to rehydrate, do not fully rehydrate and often contain numerous unpalatable "hard spots".

SUMMARY OF THE INVENTION

This invention provides a method of producing dehydrated cooked meat products which more easily and completely rehydrate than previously made dehydrated meats. This is accomplished by expansion of the cooked meat matrix by the addition of water, salt, food grade phosphates and adjunctive hydrophilic ingredients prior to cooking. This invention is intended for use on formed meats which may consist of a combination of flaked, chunked, ground or emulsified meats. The use of a gas and moisture impermeable casing for cooking the meat allows the meat to be fully cooked without concurrent losses in either weight or volume, thus preventing density increase prior to dehydration.

DETAILED DESCRIPTION

The practicing of this invention results in a dehydrated meat product which has an expanded meat matrix. The expanded matrix allows the meat to be more easily and completely rehydratable. Boneless meat is used which may be from any suitable meat cut from any animal species which is customerily used as a source of food for human consumption. Typically, it is expected that the meat will be beef, veal, lamb, pork, chicken or turkey. The meat is trimmed of all heavy connective tissue and excess fat. Trimming is essential if rehydration is to be complete. Then it is cut into pieces suitable for grinding, flaking or chunking. Up to 50 percent, but usually not more than 15 percent of the meat, is ground twice through a 0.125 inch grinder plate or emulsified in a bowl chopper. The balance of the meat may be flaked or chunked into particles having a volume of 0.001 cubic inches or larger, but which are more typically 2.5-6 cubic inches in volume. Flaked meat may be used but chunked meat is preferred in the practice of this invention. The particular brand of flaking machine used is the Urschiell Comitrol comminution machine, although other standard machines are acceptable. The actual size of the flaking head in the machine can vary from ¼" to 1", although the larger size is preferred. The flakes generated are approximately 1/32" to 1.0" thick. A conventional grinding machine equipped with a kidney plate having minimum openings of 2.5 inches may be used for producing meat chunks of suitable size.

The finely ground or emulsified meat and the chunked or flaked meat are mixed with water which may be added in the range of 1.0% to 10.0% of formula weight, but is more typically added in the range of 2.0% to 6.0% of the formula weight. If more than 10% water is added, some of the water will be purged from the meat during the cooking. Salt may be added in amounts in the range of 0.1% to 5.0%, but more typically 0.5%

BEST AVAILABLE COPY to 2.0% of the formula weight and a food grade phosphate, such as sodium tripolyphosphate may be added in amounts of 0.1% to 0.5%, but more typically about 0.5% of the formula weight. The salts which may be used include sodium chloride and potassium chloride. Food grade phosphates which are effective include the sodium salts of pyrophosphate, orthophosphate, hexametaphosphate or tripolyphosphate or mixtures thereof.

Adjunctive, hydrophilic ingredients are added to act as matrix expansion aids, wicking agents and inhibitors of myosin cross linking thereby enhancing the rate and extent of rehydration of freeze dried cooked meats. Cellulose derived food grade substances such as carboxymethyl cellulose and microcrystalline cellulose and mixtures thereof have been shown to be effective hydration aids and emulsion stabilizers in the range of 0.5% to 10.0% of the free water content of the meat but their most effective use level is in the range of 0.5% to 5.0%. Gum, such as gum arabic, polyvinylpyrrolidone, arabino gallactan, xanthan gum, kayara gum, guar gum, gum tragacanth, locust bean gum and mixtures of these in amounts in the range of 0.5% to 5.0% of formula weight. Malto dextrins and other hydrocolloids may be used in levels in the same range.

Mechanical mixing or massaging of the larger particles of meat in the presence of salt, sodium tripolyphosphate and the finely ground or flaked meat initially results in the extraction of a tacky myosin exudate. This permits forming of the meat flakes or chunks into cohesive logs of any desired geometry. The salts and phosphates in addition to aiding in the extraction of the myosin exudate, increase the water holding capacity of the raw meat. The addition of these solutes and water causes swelling of raw intact muscle and collagen cells, enhancing expansion of the meat matrix. The hydrophillic colloids, cellulose or starch derivatives, because of their affinity for water, assist in the retention of added water within the meat matrix during cooking. A relatively open cooked meat structure having a strong affinity for water after freeze dehydration is the result of adding the above ingredients and subsequently cooking the meat by no-purge techniques.

The meat and the added ingredients are mechanically mixed or tumbled until sufficient myofibrillar proteins are extracted to render the mixture moderately tacky. The product is then mixed, ideally at 40° F. for sufficient time to allow the added soluble substances to equilibrate throughout the mixture. Full equilibration depends on temperature, method of mixing and duration of mixing. A post-mixing quiescent equilibration periodd typically lasting 8 to 16 hours may be used in lieu of prolonged mixing, massaging or tumbling.

If a still equilibration period is employed, the mixture is generally remixed following equilibration to assure sufficient plasticity to enable pumping through a commercial stuffing machine. The mixture is then stuffed into moisture and gas impermeable flexible containers such as, but not limited to, casings used to protect hams, restructured roasts, and sausages. The casing used must be essentially water impervious and have an oxygen transmission rate of not more than 10 cc of $O_2$/-meter$^2$/0.001 inch thickness/24 hours at 20° C. and 0% relative humidity. A casing which meets these requirements is manufactured by Walsroder Co. of Chicago, Il. This casing has a fibrous cellulose exterior laminated onto a saran film interior. The technique for filling or stuffing the casings or other container is critical to the success of the cooking process, which must rapidly follow the stuffing procedure. The casing fits tightly to the surface of the meat so as to keep moisture in equilibrium within said meat product during cooking. The filled container must be uniformly free of voids within the mixture and at the interface of the meat and the casings. The absence of voids prevents the water present in the meat from being purged during cooking. The closure of the casings may be, but are not limited to, metal clips or thermal welds and must be watertight.

Following stuffing, red meat, such as beef, pork, veal and lamb must be cooked at temperatures not to exceed 162° F. and at 100% relative humidity. The center temperature of the meat logs may not exceed 150° F., and must be rapidly cooled to 40° F. or below immediately upon reaching this maximum center temperature. During the cooking of the meat logs, the temperature of the cooking medium must be maintained at least 10° F. than the center temperature of the meat log.

A different cooking procedure must be followed in cooking poultry products such as chicken and turkey to avoid purge. A two-stage process is followed of initiating and maintaining cooking at 150° F. and 100% relative humidity for two hours and then at 175° F. and 100% relative humidity until the product's center temperature reaches 162° F. The poultry logs are then rapidly cooled to 40° F. or below.

The cooked logs are then frozen and subsequently sliced, diced or cubed into appropriate portion sizes. The portioned meats are then subjected to vacuum freeze dehydration to about a 1.5 to 2.0% moisture level. The freeze dried meats are then packages in an airtight container in the absence of oxygen. The freeze dried meat matrices obtained by this process are significantly less dense and contain significantly less rendered fat than those obtained from conventionally cooked meats and have a strong affinity for water. The rate and extent of rehydration of cooked meats prepared for dehydration by the method of this invention is therefore significantly superior to that of meat cooked by other methods.

Test results showed that meat cooked in the fibrous/-saran casing described above sustained 0% moisture loss during cooking while meat prepared similarly except that a moisture permeable casing made from regenerated cellulose used sustained a 30% moisture loss. Each of these meat logs was frozen, sliced and freeze dehydrated. Upon rehydration with 180° F. water the meat which had no moisture loss during cooking rehydrated totally in 8 minutes while the meat which lost 30% of the moisture during cooking was only 50% rehydrated in 18 minutes. The addition of the matrix expanding ingredients resulted in a meat product 20%-30% less dense than a similarly prepared meat product which did not contain the matrix expanding ingredients.

The following examples are only a few of the possible combinations of ingredients which when processed in accordance with this invention are found to readily and completely rehydrate. The examples were prepared as discussed above.

EXAMPLE 1

| Ingredient | Percent |
|---|---|
| Beef | 93.75 |
| Water | 3.00 |
| Sodium chloride | 0.75 |
| Sodium tripolyphosphate | 0.50 |

-continued

| Ingredient | Percent |
|---|---|
| Gum arabic | 2.00 |
| | 100.00% |

EXAMPLE 2

| | |
|---|---|
| Pork | 91.75 |
| Water | 6.00 |
| Sodium chloride | 0.75 |
| Sodium tripolyphosphate | 0.50 |
| Microcrystalline cellulose | 1.00 |
| | 100.00% |

EXAMPLE 3

| | |
|---|---|
| Chicken | 91.00 |
| Water | 4.00 |
| Sodium chloride | 0.75 |
| Sodium tripolyphosphate | 0.50 |
| Malto Dextrin | 3.75 |
| | 100.00% |

EXAMPLE 4

| | |
|---|---|
| Turkey | 95.55 |
| Water | 3.00 |
| Sodium chloride | 0.75 |
| Sodium tripolyphosphate | 0.50 |
| Xanthan gum | 0.20 |
| | 100.00 |

The meat products of examples 1 to 4 rehydrated completely when placed in 180° water within 8 minutes while similarly prepared meat products which did not have the added water took 30 minutes to rehydrate and even then were frequently incompletely rehydrated.

I claim:

1. A method for producing freeze dried cooked meats which are more easily and completely rehydratable, comprising the steps of:

a. trimming a quantity of raw solid meat of heavy connective tissue and excess fat;

b. grinding or emulsifying a first portion of said trimmed meat and flaking or chunking a second portion of said trimmed meat into flakes or chunks which are 2.5–6.0 cubic inches in volume;

c. mixing said ground or emulsified first portion and said flaked or chunked second portion with about 2.0% to about 6.0% of the formula weight water, about 0.5% to about 2.0% of the formula weight salt, about 0.1% to about 0.5% of the formula weight phosphates and about 0.5% to about 5.0% of the formula weight an adjunctive hydrophilic ingredient until sufficient myofibrillar proteins are extracted to render the mixture moderately tacky and continuing said mixing until the water, salt, phosphates and adjunctive hydrophilic ingredients equilibrate throughout said mixture;

d. preparing a meat log by tightly stuffing said mixture into a moisture and gas impermeable container, wherein said container is a casing comprising a fibrous cellulose exterior laminated onto a saran film interior, said casing fitting tightly to the surface of said meat so as to keep moisture in equilibrium within said meat product during cooking;

e. cooking said meat log at a predetermined temperature for sufficient time to achieve a predetermined product center temperature;

f. freezing said meat log;

g. slicing or dicing said meat log into portions suitable for freeze dehydration;

h. freeze vacuum dehydrating said portions to a predetermined moisture level; and i. packaging said dehydrated meat in an airtight container in the absence of oxygen.

2. The method as described in claim 1 wherein said salt is selected from the group consisting of sodium chloride and potassium chloride; said phosphate is selected from the group consisting of the salts of sodium pyrophosphate, orthophosphate, hexametaphosphate and tripolyphosphate and the adjunctive hydrophilic ingredients are selected from the group consisting of sodium carboxymethyl cellulose, microcrystalline cellulose, gum arabic, polyvinylpyrrolidone, arabino gallactan, xantham gum, kayara gum, guar gum, gum tragacanth, locust bean gum, malto dextrins and hydrocolloids.

3. A meat product prepared in accordance with the process of claim 1 wherein said meat product has an expanded matrix as a result of the mixing of the meat with water, salt, phosphates and adjunctive hydrophilic ingredients and said meat product rehydrates completely within 8 minutes upon being placed in 180° F. water.

* * * * *